Figure 3:
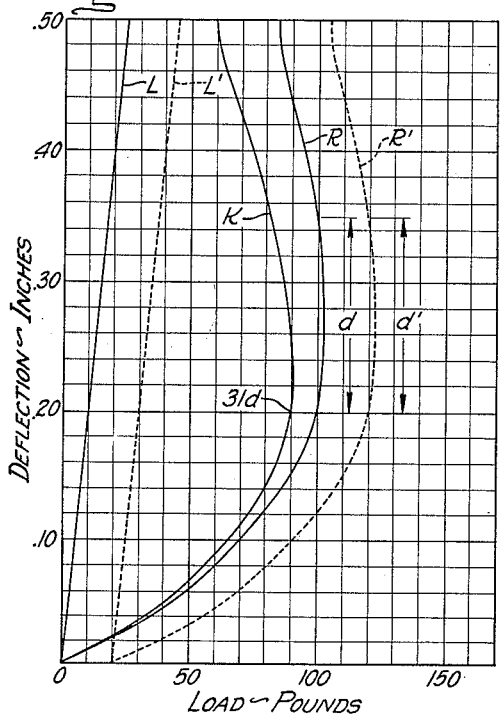

March 22, 1955

E. K. RALSTON 2,704,551

VALVE MECHANISM

Filed Dec. 10, 1946

2 Sheets-Sheet 1

Inventor:
Eldon Kipp Ralston,
by James J. Lazna
His Attorney.

March 22, 1955 E. K. RALSTON 2,704,551
VALVE MECHANISM

Filed Dec. 10, 1946 2 Sheets-Sheet 2

Inventor:
Eldon Kipp Ralston,
by James J. Lazne
His Attorney.

United States Patent Office 2,704,551
Patented Mar. 22, 1955

2,704,551

VALVE MECHANISM

Eldon Kipp Ralston, Cleveland Heights, Ohio

Application December 10, 1946, Serial No. 715,195

7 Claims. (Cl. 137—494)

My invention relates to valves of the pressure-responsive type such as pressure relief valves and pressure regulating or reducing valves, for instance, and more particularly to valves of the spring-loaded type and to a novel spring loading arrangement therefor.

In valves of the above-mentioned pressure responsive type, the closure member thereof usually is yieldingly held either in a normally closed or a normally open position by suitable resilient means. Helical coil springs have been commonly employed for such purpose, but because of the inherent characteristics of such coil springs, such as their more or less straight-line load-deflection characteristic, ordinary valves equipped with such springs do not provide good regulation of the fluid medium controlled by the valve. Thus, a simple pressure reducing valve employing a coil spring as the resilient loading means will not open fully until the controlled or discharge pressure drops appreciably below the value which the valve is set to maintain. Accordingly, when a sudden peak demand occurs, the outflow from such a valve is apt to exceed the inflow with the result that the pressure of the outflowing fluid decreases considerably below the value which the valve is set to maintain before the valve will open sufficiently to restore such set pressure. Likewise, a simple pressure relief valve employing such a coil spring will not open fully and completely, to provide a large flow capacity and therefore quick and adequate pressure relief, until the pressure of the inflowing fluid rises considerably above the set relief pressure. By the same token, such relief valves, upon being thus fully opened, will not close completely until the pressure of he inflowing fluid decreases a considerable amount. Such coil-spring type relief valves have the further disadvantage that the valve closure disc will actually begin to lift off its seat at a pressure considerably below the set relief pressure, in some cases as much as 20 per cent below the said pressure. As a result, a considerable amount of leakage occurs in the valve before the actual relief pressure is reached.

Many different types of valve constructions have been evolved in the past with the intended object of obtaining a sensitive valve which would provide good regulation. However, such valves have been for the most part of complicated or cumbersome construction involving the use of weights, levers, linkages, pilot valves, or other like mechanism. Moreover, such mechanisms do not operate with certainty under all surrounding conditions of use of the valve, as a result of which the operating characteristics of the valve undergo a change.

It is an object of the present invention, therefore, to provide a valve arrangement of the pressure-responsive type which is simple in construction and highly sensitive in operation and which will operate properly at all times regardless of the surroundings accompanying the use of the valve.

Another object of my invention is to provide a valve arrangement of the pressure-responsive type which will open fully and close fully with a very small change in the actuating pressure in each case.

Still another object of my invention is to provide a valve-arrangement of the pressure-responsive type which requires only a relatively small change in the actuating pressure to effect the full opening and the full closing of the valve and which, in addition, is adjustable to operate over a relatively wide range of set operating pressures while substantially retaining throughout said range its characteristic opening and closing characteristics.

A further object of my invention is to provide a valve-arrangement of the pressure-responsive type which will open fully and close fully in response to relatively small changes in the actuating pressure and which is adaptable to operate either with identical opening and closing pressures or with a predetermined appreciable differential therebetween.

A still further object of my invention is to provide a relief valve which will remain tightly closed substantially up to the set relief pressure of the valve and which will open fully and completely in response to a relatively small increase in actuating pressure above the set relief pressure and correspondingly close tight with a relatively small decrease in actuating pressure.

Still another object of the invention is to provide a novel combination of a pressure responsive element with fluid pressure means operatively applied to the element to move the same with a predetermined load, in combination with a frusto-conical spring metal washer operatively connected with the pressure responsive element for controlling the load. The washer preferably has a conical height H and a metal thickness T having an $H/T$ ratio of from approximately 1 to 2.75 and parts are provided engaging the washer to preload it in a direction to oppose the predetermined load with a washer deflection $d$ of approximately $0.8t$ to $1.4t$. The washer is then chosen with a thickness and diameter so that under the mentioned preloading, the washer will substantially counterbalance the predetermined load.

Figure 4:
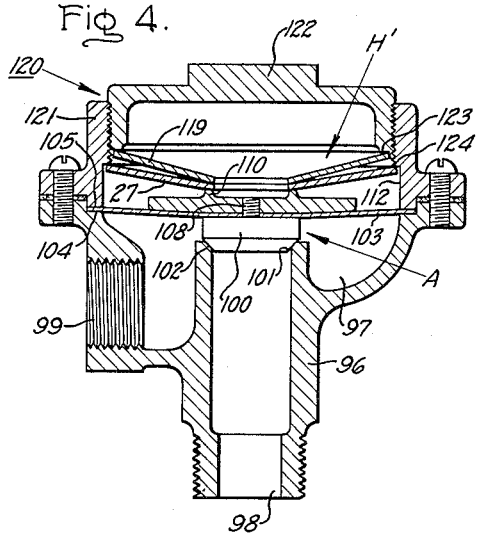
Figure 1:
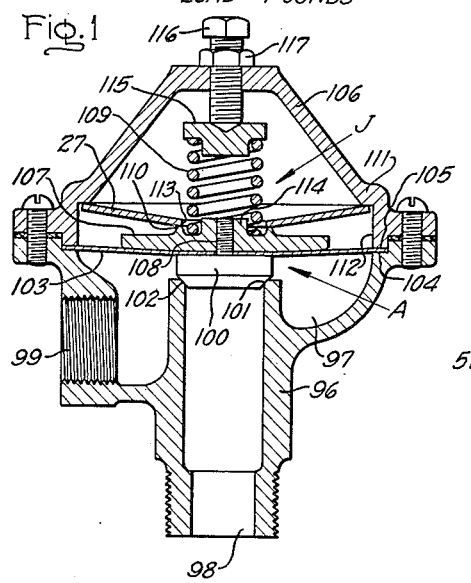
Figure 2:
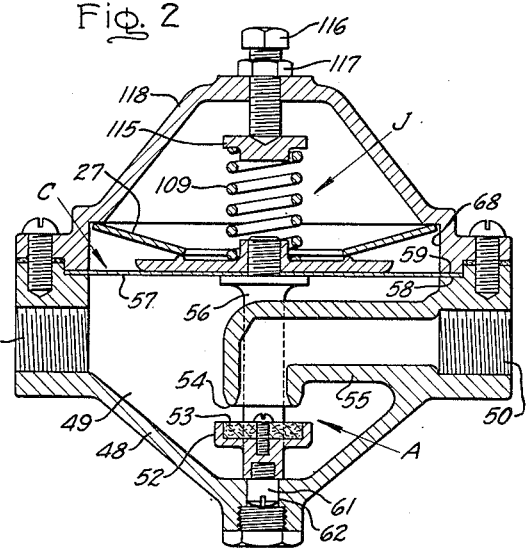
Figure 5:
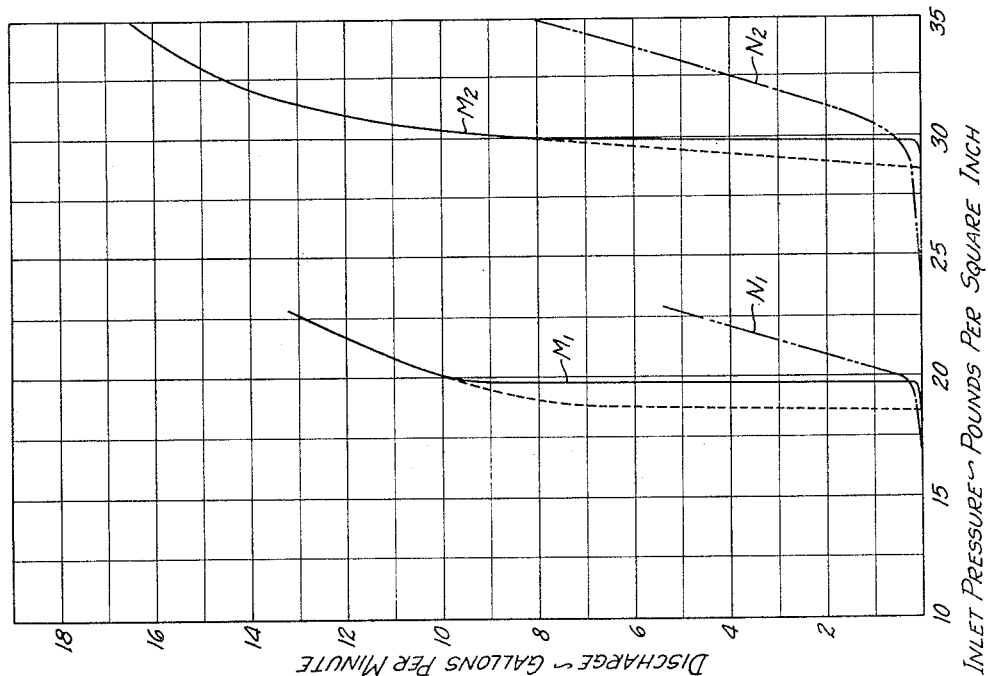

Further objects and advantages of my invention will appear from the following description of species thereof and from the accompanying drawings in which:

Fig. 1 is a sectional view of a modified form of valve spring-loading arrangement according to the invention shown applied to a diaphragm-type pressure relief valve; Fig. 2 is a sectional view showing the modified spring arrangement of Fig. 1 as applied to a pressure regulating valve; Fig. 3 is a chart illustrating a representative load-deflection diagram of the modified spring arrangement shown in Figs. 1 and 2; Fig. 4 is a fragmentary sectional view of another modified form of valve spring-loading arrangement according to the invention as applied to the valve of Fig. 1; Fig. 5 is a chart showing the pressure-flow diagrams of the valve of Fig. 1 at various operating pressure settings thereof.

Figs. 1 to 5 illustrate modified forms of valve assemblies according to the invention which possess the advantage of adjustability over a relatively wide range of operating pressures and also simplicity of manufacture. In these adjustable type valves according to the invention, variably loadable auxiliary resilient means, such as a coil spring or a second spring washer for instance, are combined with the spring washer to act either in parallel with or in opposition to the spring washer for the purpose of supplementing or opposing the main spring washer 27 and adjusting the pressure at which the valve will operate.

Fig. 1 illustrates a conventional relief valve of the diaphragm type comprising a casing 96 having a chamber 97 and inlet and outlet openings 99 and 98, respectively. Located within the valve chamber 97 is the valve proper A comprising a closure member in the form of a disc 100 having a beveled annular seating surface 101 adapted to seat against a co-operating beveled valve seat 102 formed at the inner end of the outlet 98. The disc 101 is carried by a diaphragm 103 the said diaphragm being suitably fastened in place within the valve casing 96 as by clamping its periphery between shoulders 104, 105 formed respectively on the valve casing 96 and on a bonnet 106 bolted to the said casing. The closure disc 100 is fastened concentrically to the diaphragm 103 by means of a clamping ring or flange 107 which is screwed onto a threaded stud 108, projecting from the disc through an opening in the diaphragm, to thereby clamp the diaphragm between the disc 100 and the ring 107 itself. The closure disc 100 is normaly held in its closed position seated against the valve seat 101 by the spring loading means J which comprises a dished spring washer 27 of the Belleville type together with auxiliary spring means 109 acting in parallel which, in the particular case shown, is in the form of a helical coil spring. The spring washer 27 is seated at its inner diameter on an annular ridge 110 on the clamping ring 107 and at its outer diameter against an annular shoulder 111 on the bonnet 106. The spring washer 27 fits within a cylindrical inner wall portion 112 of the bonnet 106 to thereby position the said washer concentric with the diaphragm 103 and disc 100 and center it relative to the annular seating ridge 110. The helical coil spring 109 projects through the circular central opening 113 of the spring washer 27 and seats at one end against the clamping ring 107 which is provided with a boss 114 which extends into the said coil spring to center it within the spring washer opening 113. At its other end, the coil spring 109 is seated against a follower 115. Means are provided for compressing the coil spring 109 and varying the amount of precompression thereof, the said means comprising an adjustment screw 116 threaded through the wall of the bonnet 106 and seated at its inner end on the follower 115. A lock nut 117 is provided on the adjustment screw 116 for locking the latter in the position to which it is set.

The spring washer 27 in Fig. 1 is initially compressed to an amount in the region of the point or lower limit of its maximum deflection rate. The auxiliary spring means or coil spring 109, however, may or may not be under an initial compression. Thus, at the lowest designed operating pressure setting of the valve, the spring washer 27 may carry the entire load by itself throughout the full opening and closing movement of the valve closure member 100. In such case the coil spring 109 is actually inoperative, and the operation of the valve at the said pressure setting obviously is then exactly the same as where no auxiliary coil spring 109 is provided. The coil spring 109 in such case is used only for the purpose of adjusting the valve to higher operating pressure settings. Preferably, however, the coil spring 109 or other auxiliary spring means is also under an initial compression at the lowest designed operating pressure setting of the valve, the amount of such initial compression being controlled by the adjustment screw 116. By means of this compression adjustment of the coil spring 109, the valve can be set to operate at the exact desired pressure regardless of variations in the valve parts, such as in the dimensions of the spring washer 27, the spacing between the opposite seats for the spring washer when the valve is initially assembled, and the effective area of the pressure responsive means (i. e., the closure disc itself, or the diaphragm where such a member is employed). This operating pressure adjustment feature thus greatly simplifies the manufacture of the valve since it permits the use of a spring washer which is designed to operate at a pressure somewhat below the lowest desired operating pressure of the valve (the balance of the spring load being carried by the coil spring 109) and which therefore does not have to be made with the accuracy required in those cases where it constitutes the sole spring loading means of the valve. Also, the various other parts of the valve do not have to be manufactured with the high degree of precision required in valves provided with only a spring washer 27.

The parallel acting spring washer 27 and the auxiliary spring means (coil spring 109 in Fig. 1) are so selected, in regard to their individual load-deflection characteristics as to produce, in combination, the desired resultant load-deflection characteristics and therefore the desired valve operating characteristics. This is illustrated by the load-deflection curves K and L in Fig. 3 of a specific example, wherein K is the load-deflection curve of a spring washer 27 having an $h/t$ ratio of 1.8 and L is the load-deflection curve of a suitable helical coil spring 109 having a relatively low spring constant of approximately 50 in this case. The resultant load-deflection curve of these two springs acting in parallel is found by adding the loads on the individual springs at corresponding deflections, as shown by the curve R. It will be noted that the resultant load-deflection curve R has a portion, denoted by $d$, where the deflection rate is very high, i. e., where only a relatively small change in load results in a very considerable amount of deflection. As mentioned previously, this load-deflection characteristic of the valve spring loading means according to the invention assures a valve with good regulation properties.

As previously mentioned, when the spring washer 27 and the coil spring 109 are installed in a valve according to my invention, the spring washer is precompressed to the lower region of its high deflection rate range $d$ (Fig. 3) or to approximately .20" in the particular case illustrated in Fig. 3, as indicated by the point $31d$ on the curve K. The coil spring 109, however, may or may not be initially precompressed, as stated before. In the particular case shown in Fig. 3, however, the coil spring 109 is indicated as being initially free at the same point as the spring washer, so that at the above-mentioned precompression of .20" for the spring washer 27, the coil spring 109 is precompressed a like amount. If the coil spring 109 is precompressed to a further extent than that shown in Fig. 3 by means of the adjustment screw 116, so as to change the operating pressure of the valve, the new load-deflection curve of the coil spring will be as shown by L', having the same shape as and being parallel to the curve L. The resultant load-deflection curve of K and L' will then be as shown by the curve R', which is the same shape as R only displaced to the right thereof. The new resultant curve R' also has a high deflection rate range $d'$, similar to the range $d$ of the curve L, which will provide the good valve regulation desired in accordance with the invention. From this it will be apparent that the auxiliary spring means (coil spring 109 in this case) may be precompressed to any degree as long as it remains within its free operating range (i. e., does not close solid) during the operation of the valve, and the resultant load-deflection curve of both springs will have the same characteristic shape and thus the same desired high deflection rate range throughout the full precompression range of the coil spring.

In the specific case shown in Fig. 3, the spring washer 27 and coil spring 109 were chosen to give a resultant load-deflection curve R or R' having an operating range $d$ or $d'$ characterized by a relatively high deflection rate such that only a relatively slight increase in load is required to cause the spring means J to move or deflect throughout its entire operating range to thereby either open or close the valve completely, depending on the type of valve involved. In this case also, only a slight decrease in load would be required to cause the spring means J to return to its original position to thereby either close or open the valve completely. In some types of valves, however, it may be desirable to require a somewhat greater increase in load (although less than would be required with a conventional coil spring loaded valve) to cause the spring means J to deflect throughout its operating range. In such case, a spring washer 27 with a lower $h/t$ ratio or a helical spring 109 with a greater spring constant or both, would be employed. On the other hand, it may be desirable in some cases to employ a spring means J which will require an appreciable decrease in pressure or differential to cause it to return from the upper end of its operating range to the lower end thereof. In such case, a spring washer 27 with a higher $h/t$ ratio or a helical spring 109 with a lower spring constant, or both, would be employed. It will thus be apparent that by so selecting the spring washer 27 and the auxiliary spring means 109, the average shape of the deflection rate portion of the resultant load-deflection curve can be changed as desired.

When a coil spring 109 is employed as the auxiliary spring means, as in Fig. 1, it will generally be desirable to employ a coil spring having a spring constant varying from .001 $P_m/t$ to 10 $P_m/t$, where $P_m$ is the minimum total operating load on both the coil spring and spring washer (i. e., the total load which will be applied to the spring combination at the lowest pressure at which the valve is designed to operate) and $t$ is the thickness of the spring washer. In other words, the coil spring or other auxiliary spring means 109 employed should generally have a spring rate greater than, and preferably relatively high as compared to, the initial spring rate of the spring washer starting at zero deflection.

Among the various possible spring combinations that may be utilized in accordance with the invention, those having resultant load-deflection characteristics similar to those of the group of spring washers having $h/t$ ratios of around $\sqrt{2}$ and above (i. e., having either a snap-over or a substantially straight line vertical portion in its load-deflection curve) will find the greatest application in practice.

The operating characteristics of the modified valve arrangements employing an auxiliary spring means in addition to the spring washer are determined, of course, by the resultant load-deflection characteristics of the particular spring combination. The operating characteristics of the particular pressure relief valve illustrated in Fig. 1 are shown by the pressure-flow diagrams in Fig. 5 of such a valve when set to operate at different pressures. In Fig. 5, the diagrams M1, M2 indicate the opening and closing action of a valve according to Fig. 1 at operating pressure settings of approximately 20 and 30 pounds per square inch respectively, the full line portion of the diagram representing the opening action and the dotted line portion the closing action. The diagrams N1, N2 indicate the operation, at corresponding pressure settings, of the very same valve when equipped with the conventional coil spring only instead of the combination coil spring-spring washer arrangement of Fig. 1. The flow diagram M1 clearly indicates the same quick-opening characteristic for the valve of Fig. 1 as is possessed by a valve employing a spring washer alone. The valve of Fig. 1 closes fully and completely with only a slight drop in pressure.

Comparing the curves M1, M2 in Fig. 5, it will be seen that curve M2 is very much the same as M1, thus indicating that the operation of the valve of Fig. 1 at the higher operating pressure setting of 30 pounds per square inch is substantially the same as that at the lower pressure setting of 20 pounds per square inch. The curves M1, M2 thus clearly illustrate that the quick-opening characteristic of the modified valve according to Fig. 1 carries through substantially the full range of operating pressure adjustment of the valve. This should be so since, as pointed out hereinbefore, the characteristic shape of the resultant load-deflection diagram R of the spring combination J remains the same for any precompression of the coil spring up to its free operating range, the said diagram being merely displaced to the right as shown in Fig. 3.

Fig. 2 illustrates the application of the modified spring loading arrangement J in Fig. 1 to a pressure regulating valve. Except for the coil spring 109, follower 115, adjustment screw 116, and the bell-shaped bonnet 118 which is required to accommodate the added coil spring and its adjustment screw, the valve is otherwise identical with a valve having spring washer 27 only for closing. As in the case of the valve of Fig. 1, the coil spring 109 in Fig. 2 is adjustable to various degrees of compression to thereby adjust the operating pressure setting of the valve. Likewise, the spring washer 27 and coil spring 109 in Fig. 2 are so selected, in regard to their individual load-deflection characteristics, as to produce the desired resultant load-deflection characteristics and therefore the desired valve operating characteristics. Like the valve of Fig. 1, the characteristic quick-closing and quick-opening action of the valve of Fig. 2 carries throughout the designed range of operating pressure settings thereof.

While I have illustrated in Figs. 1 and 2 the combination spring washer-auxiliary spring assembly J as applied to a pressure relief valve and to a pressure regulating valve, it is obvious that such a spring arrangement may be applied as well to any other type of spring loaded valve.

Fig. 4 illustrates a modification of the spring loading arrangement J shown in Figs. 1 and 2, wherein a second dished spring washer 119 is used in place of the coil spring 109 of Figs. 1 and 2 to provide for adjustment of the operating pressure setting of the valve. This modified form of spring loading arrangement J' is shown as applied to a diaphragm type pressure relief valve of the type shown in Fig. 1. Except for the bonnet 120, the valve of Fig. 4 is otherwise the same as that shown in Fig. 1. The bonnet 120 is made in two pieces instead of one as in Fig. 1, and comprises a cylindrical base or lower portion 121 and a cover portion 122 which is threaded onto the base portion 121 and is provided with an annular shoulder 123 which extends into the base portion to provide a seat for engaging the outer periphery of the auxiliary spring washer 119 which is mounted on top and is nested within the main spring washer 27. The spring washer 119 bears at its inner periphery against the inner periphery of the main spring washer 27 while the latter bears at its outer periphery against an annular shoulder 124 formed in the inner wall of the bonnet base portion 121. The two spring washers 27 and 119 are so designed that, when assembled in place in the valve assembly and the valve is set for operation at the lowest pressure within the designed range of operating pressures, the auxiliary spring washer 119 will be dished to a greater degree (i. e., its opposite sides will be inclined at a steeper angle) than the main spring washer 27 so as to space the outer periphery of the auxiliary spring washer 119 a sufficient distance from the outer periphery of the main spring washer 27 to permit additional compression of the auxiliary spring washer 119 by the adjustable cover 122 for the purpose of raising the operating pressure setting of the valve. As in the case of the valves of Figs. 1 and 2, the spring washers 27 and 119 in Fig. 4 are further so selected in respect to their individual load-deflection characteristics as to produce, in combination, the desired resultant load-deflection characteristics and therefore the desired valve operating characteristics.

While I have shown and described several representative forms of spring combinations in Figs. 1, 2, and 4, various other combinations may be utilized in order to obtain the desired resultant load-deflection characteristics. Thus, instead of the helical coil spring 109 or 127, various other types of springs may be employed, such as a helical spring having special characteristics (for instance, a variable pitch), a conical spring, a volute spring, etc., or various combinations of spring washers may be utilized, arranged either in series or in parallel, or the auxiliary spring means may be arranged to come into operation only during a certain range, or after a certain amount, of deflection of the main spring washer 27.

I believe my invention will be more clearly understood if I recapitulate the steps taken in solving a specific problem. In any given case, the predetermined load to be handled can be calculated from the area of the valve or diaphragm multiplied by the pounds per square inch of fluid pressure applied to that area. I known that for best results the ratio between the spring washer height $h$ to the washer thickness $t$ must be in the neighborhood of 1.4 to 1.6 for best results. I then select a thickness and diameter of washer which experience tells me and calculations show will withstand the predetermined load. I then take this washer and calculate it for the maximum deflection of the spring washer necessary to open the valve or other control element the amount necessary to allow the fluid flow for which the valve or other apparatus is designed. Applying this deflection to the washer chosen, I determine whether the metal of the washer will be within the safe tensile strength of the metal used. If it is beyond the safe tensile strength, I then increase the diameter of the washer until I obtain a washer which will safely withstand the load desired. This washer must be such that when deflected by an amount approximately equal to the thickness of the metal of the washer, it will exert a force against the predetermined load which is approximately equal to the predetermined load. The parts surrounding the spring washer are then so arranged as explained in connection with the various drawings, so that the spring washer is held under this predetermined load before the valve or other control part starts to move. In other words, this preloading of the spring washer corresponds to initial compression of the spring washer to a deflection in the region of the lower end of its range of maximum deflection rate.

What I claim as new and desire to secure by Letters Patent of the United States is:

1. A valve assembly comprising a casing having inlet and outlet openings, a control valve within said casing for regulating passage of fluid between said openings, said control valve comprising a closure member movable between an open position and a closed position, spring loading means comprising a dished spring washer and auxiliary resilient means mounted to act in parallel with each other and yieldingly hold said closure member in one of said positions against movement towards the other of said positions, and adjustment means coacting with said auxiliary resilient means for varying the load applied thereby independently of the load applied by the spring washer.

2. A valve assembly comprising a casing having inlet and outlet openings, a control valve within said casing for regulating passage of fluid between said openings, said control valve comprising a closure member movable between an open position and a closed position, spring loading means comprising a dished spring washer and a compression coil spring mounted to act in parallel with each other and yieldingly hold said closure member in one of said positions against movement towards the other of said positions, and adjustment means coacting with said coil spring for varying the load applied thereby independently of the load applied by the spring washer.

3. A valve assembly comprising a casing having inlet and outlet openings, a control valve within said casing for regulating passage of fluid between said openings, said control valve comprising a closure member movable between an open position and a closed position, spring loading means comprising a pair of dished spring washers mounted to act in parallel with each other and yieldingly hold said closure member in one of said positions against movement towards the other of said positions, said spring means having different load-carrying capacities, and adjustment means coacting with one of said spring washers for varying the load applied thereby independently of the load applied by the other of said spring washers.

4. A relief valve assembly comprising a casing having inlet and outlet openings, means for regulating passage of fluid between said openings comprising a valve seat within said casing and a cooperating valve, spring loading means comprising a dished spring washer and a compression coil spring mounted within said casing to act in parallel with each other and yieldingly hold said valve against the said seat to normally close the valve, said coil spring having a spring rate in inches deflection per pound of load greater than the initial spring rate of the spring washer at zero deflection, and adjustment means coacting with said coil spring for varying the load applied thereby independently of the load applied by the spring washer.

5. A relief valve assembly comprising a casing having inlet and outlet openings, means for regulating passage of fluid between said openings comprising a valve seat within said casing and a cooperating valve, spring loading means comprising a dished spring washer and a compression coil spring mounted within said casing to act in parallel with each other and yieldingly hold said valve against the said seat to normally close the valve, said spring washer being initially compressed an amount between 0.8 to 1.4 of its thickness, and adjustment means coacting with said coil spring for varying the load applied thereby independently of the load applied by the spring washer.

6. A relief valve assembly comprising a casing having inlet and outlet openings, means for regulating passage of fluid between said openings comprising a valve seat within said casing and a cooperating valve, spring loading means comprising a dished spring washer and a compression coil spring mounted within said casing to act in parallel with each other and yieldingly hold said valve against the said seat to normally close the valve, said spring washer being initially compressed an amount between 0.8 to 1.4 of its thickness and having an $h/t$ ratio of from approximately 1 to 2¾ and said coil spring having a spring rate relatively high in comparison to the initial spring rate of the spring washer at zero deflection, and adjustment means coacting with said coil spring for varying the load applied thereby independently of the load applied by the spring washer.

7. A valve assembly comprising a casing having inlet and outlet openings, a control valve within said casing for regulating passage of fluid between said openings, said control valve comprising a closure member movable between an open position and a closed position, pressure means acting on said closure member and tending to move it toward one of its said positions, spring loading means comprising a dished spring washer and auxiliary resilient means mounted to act in parallel with each other and yieldingly to urge said closure member toward the other of its said positions in opposition to said pressure means, and adjustment means coacting with said auxiliary resilient means for varying the load applied thereby independently of the load applied by the spring washer.

References Cited in the file of this patent

UNITED STATES PATENTS

| Number | Name | Date |
|---|---|---|
| 65,254 | Meggenhofen | May 28, 1867 |
| 627,390 | Cash | June 20, 1899 |
| 1,462,937 | Holton | July 24, 1923 |
| 1,651,237 | Wilkins | Nov. 29, 1927 |
| 2,070,659 | Higham | Feb. 16, 1937 |
| 2,308,475 | Fawkes | Jan. 12, 1943 |
| 2,325,193 | Nutt | July 27, 1943 |
| 2,332,630 | Fawkes | Oct. 26, 1943 |